United States Patent
Kim et al.

(10) Patent No.: US 7,740,336 B2
(45) Date of Patent: Jun. 22, 2010

(54) ARRAY TYPE MULTI-PASS INKJET PRINTER AND OPERATING METHOD THEREOF

(75) Inventors: Soo-hyun Kim, Suwon-si (KR); Masahiko Habuka, Suwon-si (KR); Heon-soo Park, Seongnam-si (KR); Karp-sik Youn, Hwaseong-si (KR); Hee-yuel Roh, Suwon-si (KR); Jung-dae Heo, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 423 days.

(21) Appl. No.: 11/678,768

(22) Filed: Feb. 26, 2007

(65) Prior Publication Data

US 2007/0296756 A1    Dec. 27, 2007

(30) Foreign Application Priority Data

Jun. 21, 2006    (KR) ............... 10-2006-0056074

(51) Int. Cl.
*B41J 2/15* (2006.01)
(52) U.S. Cl. ............... 347/41; 347/19; 347/105
(58) Field of Classification Search ............... 347/12, 347/41, 15, 19, 101, 105
See application file for complete search history.

(56) References Cited

U.S. PATENT DOCUMENTS 6,203,140 B1    3/2001    Oyen
6,217,148 B1 *  4/2001    Adler et al. ............... 347/41

FOREIGN PATENT DOCUMENTS

EP    0 782 096 A2    7/1997
WO    WO 90/14957 A1    12/1990
WO    WO 97/31781 A1    9/1997

OTHER PUBLICATIONS

European Search Report issued Sep. 12, 2008 (European Application No. 07105568.5).

* cited by examiner

*Primary Examiner*—Lamson D Nguyen
(74) *Attorney, Agent, or Firm*—Stanzione & Kim LLP

(57) ABSTRACT

An array type multi-pass inkjet printer head and an operating method thereof. The array type inkjet printer includes an image dividing unit to divide an image to be printed into a plurality of images, a printing unit having a head and to print one of the plurality of divided images on a printing medium using the head, the head being formed in a lateral direction and having a plurality of nozzles disposed in a longitudinal direction thereof, a feedback unit to reversely move the printing medium to a preceding end of the printing unit after the one of the plurality of divided images is printed by the printing unit, and a control unit to control the printing unit to print a divided image next to the printed one image on the reversely printing medium.

8 Claims, 11 Drawing Sheets

1st

2nd

3rd

4th

FINAL IMAGE

| 1st | 2nd | 3rd | 4th | FINAL |
| (a) | (b) | (c) | (d) | (e) |

1st

2nd

3rd

4th

FINAL IMAGE

ARRAY TYPE MULTI-PASS INKJET PRINTER AND OPERATING METHOD THEREOF

CROSS-REFERENCE TO RELATED APPLICATIONS

This application claims the benefit under 35 U.S.C. §119(a) of Korean Patent Application No. 10-2006-056074, filed Jun. 21, 2006, in the Korean Intellectual Property Office, the entire disclosure of which is incorporated herein by reference.

BACKGROUND OF THE INVENTION

1. Field of the Invention

The present general inventive concept relates to an array type multi-pass inkjet printer and an operating method thereof. More particularly, the present general inventive concept relates to an array type multi-pass inkjet printer capable of enhancing a resolution and compensating a defective image occurring due to defective nozzles and, and an operating method thereof.

2. Description of the Related Art

An inkjet printer is a printer, which carries out a printing operation in a manner of ejecting ink droplets onto a printing medium, such as a paper or a film, through nozzles according to a control signal thereof.

The inkjet printer can be classified into a shuttle type inkjet printer and an array type inkjet printer according to a method of driving a head for printing.

The shuttle type inkjet printer has a head in which a plurality of nozzles are arranged in a horizontal scan direction. The head prints data in a line while moving in a horizontal scan direction perpendicular to a feeding direction of the printing medium and data in different lines while moving in a vertical scan direction parallel to the feeding direction.

The array type inkjet printer has a head in which a plurality of nozzles are arranged along the horizontal scan direction to correspond to a width of the printing medium and along the vertical scan direction to print data by a unit of lines in the vertical scan direction. The head only moves in the vertical scan direction.

In such a head of the array type inkjet printer are formed several thousands of nozzles according to a resolution or a design. If 1,200 nozzles are formed in a line, a head of, for example, a color printer has 4,800(=1200*4) nozzles since it supports four colors of cyan, magenta, yellow, and black.

If there are dead (defective) nozzles in a portion of the head of the array type inkjet printer as described above, the defective nozzles cannot eject ink droplets on corresponding portions of an image, thereby outputting a defective image. In this case, however, there is no method to compensate the output defective image other than by replacing the head with a new one.

Also, in the array type inkjet printer, a resolution is physically determined according to the number of the nozzles formed in the head. However, there is no method proposed to improve more than the resolution physically determined as described above as yet.

SUMMARY OF THE INVENTION

The present general inventive concept provides an array type multi-pass inkjet printer, which overlappingly prints a plurality of divided images on the same position of a printing medium to output a finished image, and an operating method thereof.

Additional aspects and/or utilities of the present general inventive concept will be set forth in part in the description which follows and, in part, will be obvious from the description, or may be learned by practice of the general inventive concept.

The foregoing and/or other aspects of the present general inventive concept may be achieved by providing an array type multi-pass inkjet printer including an image dividing unit to divide an image to be printed into a plurality of images, a printing unit having a head and to print one of the plurality of divided images on a printing medium using the head, the head being formed in a lateral direction and having a plurality of nozzles disposed in a longitudinal direction thereof, a feedback unit to reversely move the printing medium to a preceding end of the printing unit after the one of the plurality of divided images is printed by the printing unit, and a control unit to control the printing unit to print another divided image next to the printed divided image on the reversely moved printing medium.

Each of the plurality of divided images may have the same size as the entire size of the image to be printed, and be composed of a portion of the entire pixels forming the image to be printed.

The image dividing unit may be a firmware.

The printing unit may further include a position detecting sensor to sense whether the reversely moved printing medium is positioned at the same position as that thereof in a previous printing operation.

The feedback unit may include a feedback roller to be driven in a direction, which reversely moves the printing medium, and a diverter to operate in connection with the feedback roller and to determine a path of the printing medium.

The control unit may control the feedback unit to reversely move the printing medium until a last image of the plurality of divided images is to be printed.

The printer may further include a head moving unit to move the head in a horizontal direction by a predetermined distance. In this case, the control unit may control the printing unit to print the divided image next to the printed one image on the reversely moved printing medium after the head is moved by the head moving unit. At this time, the predetermined distance is determined by the number of the nozzles to be moved.

The foregoing and/or other aspects of the present general inventive concept may be achieved by providing an operating method of an array type inkjet printer including a printing unit having a head formed in a lateral direction, the head having a plurality of nozzles disposed in a longitudinal direction thereof, the operating method including dividing an image to be printed into a plurality of image, printing one of the plurality of divided images, reversely moving an printing medium having the one divided image printed thereon to a preceding end of the printing unit, printing a divided image next to the printed one image on the reversely moved printing medium, and outputting the printing medium after the last image of the plurality of divided images is printed.

Each of the plurality of divided images may have the same size as the entire size of the image to be printed, and be composed of a portion of the entire pixels forming the image to be printed.

The method may further include sensing whether the reversely moved printing medium is positioned at the same position as that thereof in a previous printing operation.

The method may further include moving the head in a horizontal direction by a predetermined distance after reversely moving the printing medium to the preceding end of the printing unit. At this time, the predetermined distance may be determined by the number of the nozzles to be moved.

The foregoing and/or other aspects of the present general inventive concept may also be achieved by providing a computer readable recording medium containing computer readable codes as a program to perform a method of a printer, the method including dividing an image to be printed into a plurality of image, printing one of the plurality of divided images on a printing medium, reversely moving the printing medium having the one of the plurality of divided images printed thereon to a preceding end of the printing unit, printing a divided image next to the printed one image on the reversely moved printing medium, and outputting the printing medium after a last image of the plurality of divided images is printed.

The foregoing and/or other aspects of the present general inventive concept may be achieved by providing an array type multi-pass inkjet printer including a printing unit to form an image having a resolution on a printing medium, and a control unit to control the printing unit to form a first image having a first resolution of the resolution of the image on the printing medium and to form a second image having a second resolution of the resolution of the image on the printing medium.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
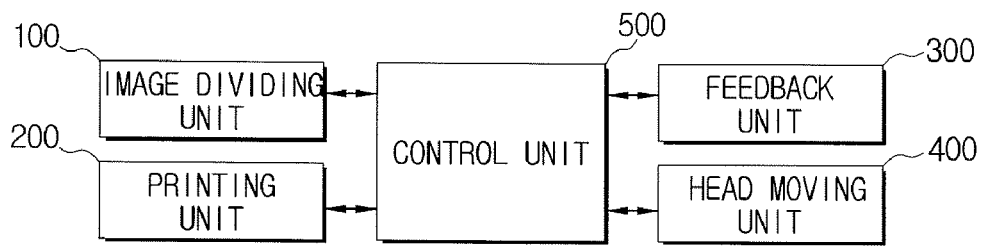
FIG. 1 is a block diagram illustrating an array type multi-pass inkjet printer according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2A:
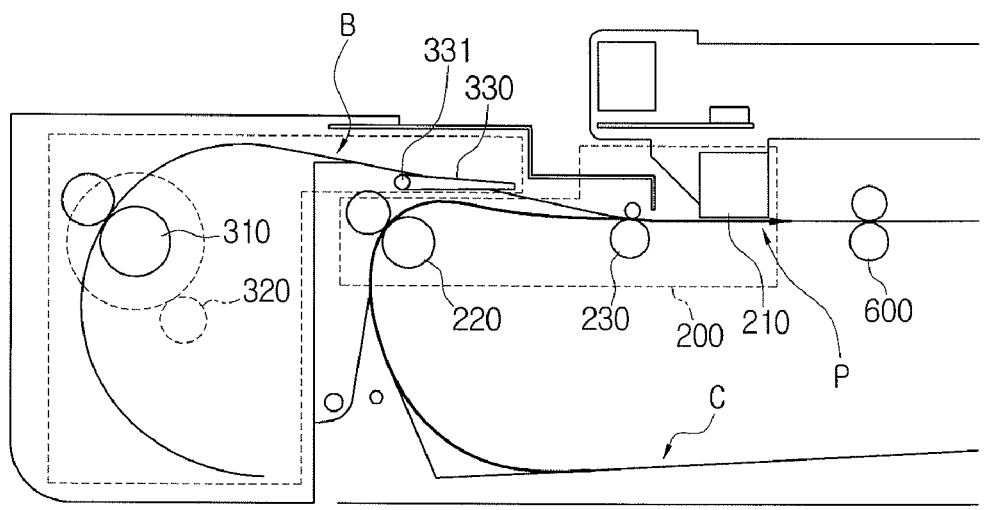
FIGS. 2A through 2C are schematic side elevation views illustrating a path of a printing medium in the array type multi-pass inkjet printer of FIG. 1.
Figure 2B:
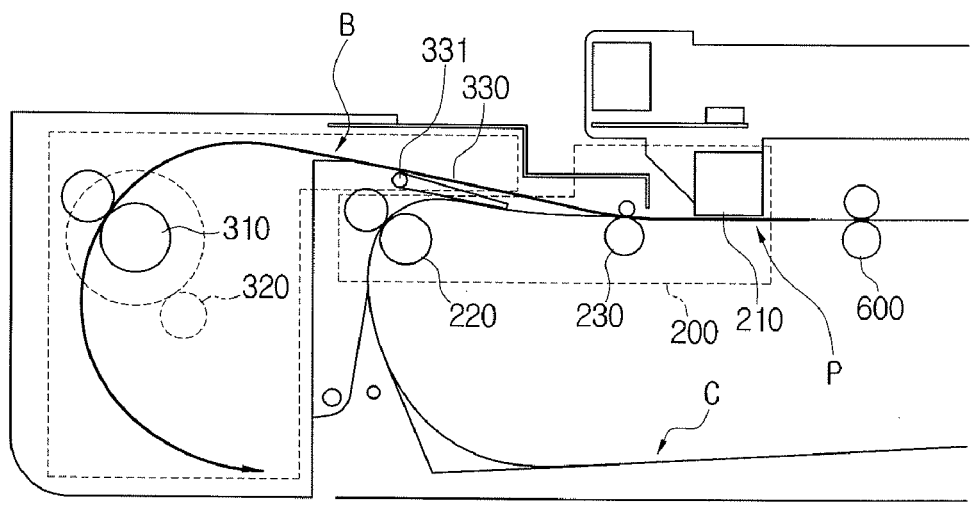
Figure 2C:
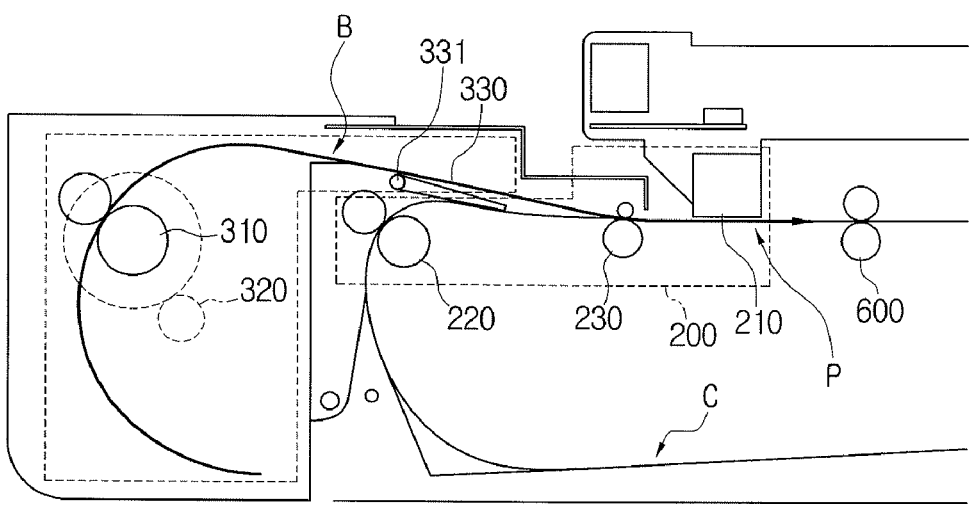

FIG. 1 is a block diagram illustrating an array type multi-pass inkjet printer according to an embodiment of the present general inventive concept, and FIGS. 2A through 2C are schematic side elevation views illustrating a path of a printing medium in the array type multi-pass inkjet printer of FIG. 1.

Referring to FIG. 1, the array type multi-pass inkjet printer includes an image dividing unit 100, a printing unit 200, a feedback unit 300, a head moving unit 400, and a control unit 500.

The image dividing unit 100 divides an image into a plurality of images. Here, the image to be printed may be printing data, which is received from a host, such as a computer.

Each of the plurality of images divided from the image to be printed by the image dividing unit 100 has the same size as the entire size (full size) of the image to be printed, and is composed of a portion of entire pixels forming the image to be printed. When the image has a main resolution, the divided images have sub-resolutions.

The image dividing unit 100 may be a firmware, which is built into the array type multi-pass inkjet printer. The firmware may be a program that permanently forms a portion of its device into which the program itself is built.

The image dividing unit 100 divides the image to be printed into the plurality of images, so that each of the plurality of images has the same size as the entire size of the image to be printed, but has the number of dots (pixels) smaller than that of the image to be printed and the dots to be printed arranged in a predetermined dividing direction to be different from those of other divided images. Here, the predetermined dividing direction may be any one of a vertical dividing direction, a horizontal dividing direction, and a random dividing direction.

An image dividing method of the image dividing unit 100 will be described in details later with reference to FIGS. 3A through 3D, 4A through 4F, 5A through 5D, and 6A through 6E.

Referring to FIGS. 2A, 2B, and 2C, the printing unit 200 includes a head 210, a driving roller 220, and a feed roller 230, and carries out a printing operation for the image to be printed. The head 210 includes one or more head units formed in a lateral direction corresponding to a width direction of a printing medium or perpendicular to a feeding direction of the printing medium, and a plurality of nozzles disposed on one or more lines of the one or more head units formed in a longitudinal direction thereof to perform a printing operation.

The printing unit 200 can further includes a position detecting sensor 201, which sense whether the printing medium reversely moved by the feedback unit 300 is positioned at the same position as that thereof in a previous printing operation. The position detecting sensor detects a side edge and/or a front (leading) edge of the printing medium thus to sense whether the printing medium is positioned at the same position as that thereof in the previous printing operation. If the printing medium is positioned at the same position, the printing unit 200 continues to carry out the printing operation, but if not, can correct the position of the printing medium.

The plurality of nozzles is formed in a surface of the head 210, and face the printing medium. An ink outlet to eject ink is formed in an end of each nozzle, and a cap to block the ink outlet is mounted outside ends of the nozzles to cap the head 210.

As a method of ejecting the ink from the nozzles, a thermal transfer ink-ejecting method is widely used to eject the ink using heat. To employ the thermal transfer ink-ejecting method, a thin film heater for generating the heat is formed at a region adjacent to the ink outlet in each nozzle. When the heat is generated by the thin film heater, the ink is heated and changed from a liquid state to a vapor state, that is, ink bubbles are generated, to generate a change in volume. According to this, the ink is pushed by ink bubbles to eject ink droplets through the ink outlet of the nozzle.

The feedback unit 300 reversely moves the printing medium to a preceding end (a left end of FIG. 2B) of the printing unit 200, that is, a feedback area B, after one of the plurality of images divided by the image dividing unit 100 is printed on the printing medium by the printing unit 200 in a printing area P. The feedback unit 300 includes a feedback roller 310, a motor 320, and a diverter 330, as illustrated in FIG. 2A to be described below.

The feedback roller 310 is driven in a direction of returning the printing medium, so that the printing medium on which the one divided image printed is moved to the preceding end (feedback area B) of the printing unit 200 by a driving force of the driving motor 320.

The diverter 330 operates in connection with the feedback roller 310, and determines a path of the printing medium. Operations on the feedback roller 310 and the diverter 330 will be described in details later with reference to FIGS. 1 and 2A through 2C.

The head moving unit 400 moves the head 210 by a predetermined distance in a horizontal direction. The horizontal direction may be a direction perpendicular to a feeding direction of the printing medium or parallel to a widthwise direction of the printing medium. The head moving unit 400 moves the head 210 by the predetermined distance under a control of the control unit 500 after the printing unit 200 has printed one of the plurality of divided images, so that the printing unit 200 can print another image, i.e., a next image of the plurality of divided images again using the moved head. Accordingly, even though there are dead or defective nozzles of a portion of the head, the next image can be printed again by normal nozzles. As a result, the inkjet printer can compensate for a defective portion of the image. At this time, the predetermined distance can be determined according to the number of nozzles to be moved. It is possible that the predetermined distance may be determined according to a pitch of the adjacent nozzles.

The control unit 500 controls a general operation of the array type multi-pass inkjet printer. That is, the control unit 500 controls signal inputs and signal outputs among the image dividing unit 100, the printing unit 200, the feedback unit 300 and the head moving unit 400.

When the image to be printed is divided into the plurality of images by the image dividing unit 100, the control unit 500 controls the printing unit 200 to print the one of the plurality of divided images on the printing medium in the printing area P. And then, the control unit 500 controls the feedback unit 300 to reversely move the printing medium on which the one divided image is printed to the preceding end B of the printing unit 200, and controls the printing unit 200 to print a divided image next to the printed one image on the reversely moved printing medium in the printing area P. When the printing medium is reversely moved, the printing medium moves in a direction opposite to the feeding direction of the printing medium to be printed, and then moves forward to the printing area P in the feeding direction.

The control unit 500 controls the printing unit 200 and the feedback unit 300, so that until a printing operation for the last image out of the plurality of images divided by the image dividing unit 100 is ready to perform, the above process is repeated to print the one divided image, to reversely move the printing medium on which the one divided image is printed, and to print another divided image next to the printed one image on the reversely moved printing medium.

At this time, the control unit 500 can control the head moving unit 400 to move the head 210 by the predetermined distance whenever the printing unit 200 has printed one divided image. When printing the next divided image after moving the head 210 in respective printing operations as described above, the inkjet printer can obtain the image compensated more than that obtained when the next divided image is printed without moving the head 210 every printing.

Hereinafter, a moving path of the printing medium in the array type multi-pass inkjet printer according to the present embodiment will be described with reference to FIGS. 2A through 2C. To explain the moving path of the printing medium, FIGS. 2A through 2C schematically illustrate the array type multi-pass inkjet printer in side elevation views, respectively.

The printing medium supplied from a medium-supplying unit "C" is moved below the head 210 in the printing area P along a direction (feeding direction) of an arrow illustrated in FIG. 2A by the driving roller 220 and the feed roller 230. At this time, the diverter 330 of the feedback unit 300 is oriented in a horizontal direction, so that the printing medium is moved under the diverter 330 from the medium supplying unit "C" to the printing area P.

When the printing medium is located under the head 210, the printing unit 200 prints one image of the plurality of images divided by the image dividing unit 100 on the printing medium under a control of the control unit 500. The printing medium on which the one divided image is printed is reversely moved along the direction of the arrow illustrated in FIG. 2B by the feed roller 310 and the diverter 330 of the feedback unit 300. At this time, an end of the diverter 330 is moved downward with respect to a shaft 331, so that the printing medium is reversely moved along the direction of arrow illustrated in FIG. 2B passing over the diverter 330.

After the printing medium is reversely moved to the preceding end of the printing unit 200 or to an inside of the feedback unit 300, that is, the feedback area B, it is moved again in a direction opposite to the direction of the arrow in FIG. 2B, i.e., a direction of an arrow illustrated in FIG. 2C, in the same moving path as that of FIG. 2B, so that it is located below the head 210. At this time, since the printing medium does not change a moving path thereof, but a moving direction thereof, the diverter 330 of the feedback unit 300 does not switch a medium-guiding direction thereof.

When the printing medium is moved along the direction of the arrow illustrated in FIG. 2C, the printing unit 200 prints a divided image next to the printed one image on the printing medium. That is, pixels of the currently printed divided image are disposed next to respective pixels of the previously printed one image. After that, if there is remained a divided image which is not printed among the plurality of images divided by the image dividing unit 100, the printing medium is reversely moved again as described with reference to FIG. 2B, and then printed with the divided image which is not printed. If all of the plurality of images divided by the image dividing unit 100 have been printed, the printing medium is discharged to the outside of the array type multi-pass inkjet printer through a discharging roller 600.

FIGS. 3A through 3D illustrating image dividing methods of the array type multi-pass inkjet printer according to an embodiment of the present general inventive concept.

Figure 3A:
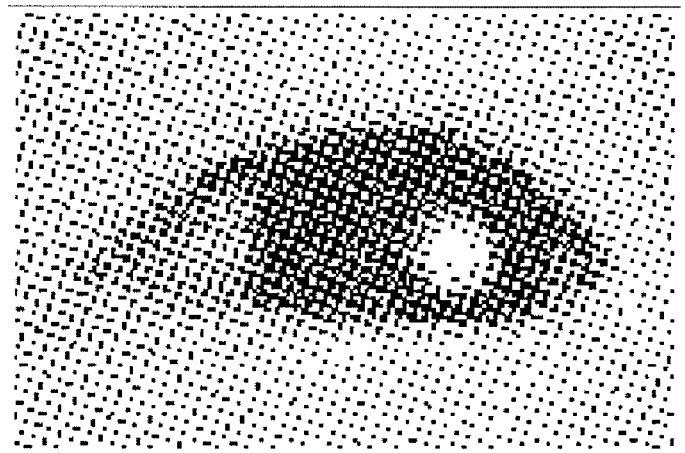
FIGS. 3A through 3D are views illustrating image dividing methods of the array type multi-pass inkjet printer of FIG. 1 according to an embodiment of the present general inventive concept.

FIG. 3A illustrates an image, which is to be actually printed by the array type multi-pass inkjet printer. The image to be printed illustrated in FIG. 3A is divided into a plurality of images by the image dividing unit 100.

The image dividing unit 100 divides the image to be printed into the plurality of images, so that each of the plurality of divided images has the same size as the entire size of the image to be printed. However, each divided image may have the number of dots smaller than that of the image to be printed. Each divided image may have the dots arranged in any one of a vertical dividing direction, a horizontal dividing direction, and a random dividing direction to be different from those of other divided images. That is, each of the plurality of divided images has the same size as the entire size of the image to be printed, and is composed of a portion of entire pixels forming the image to be printed. A sum of pixels of all of the divided images may be the same as the entire pixels of the image to be printed.

Figure 3B:
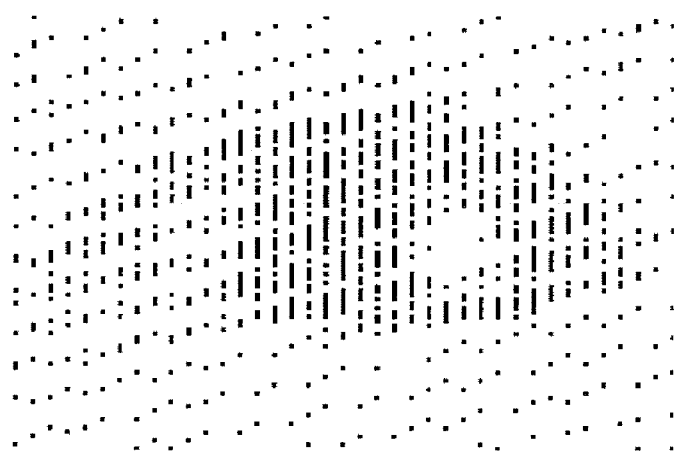
Figure 3C:
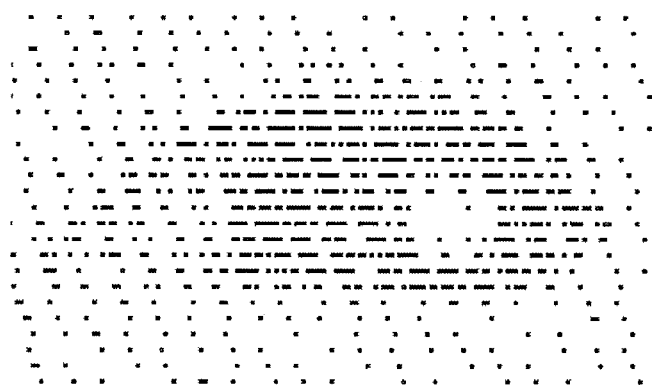
Figure 3D:
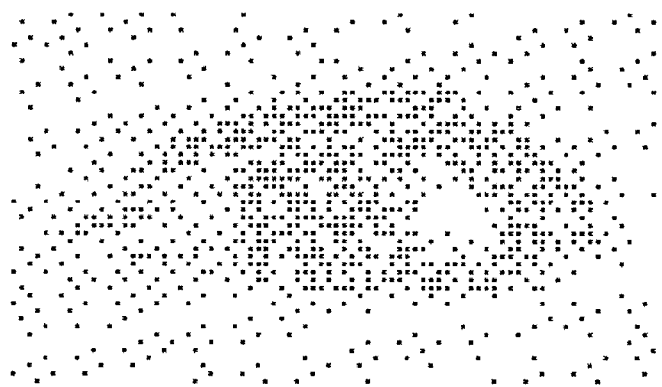

FIGS. 3B, 3C and 3D illustrate the divided images, which are obtained by dividing the image of FIG. 3A in the vertical dividing direction, the horizontal dividing direction, and the random dividing direction, respectively.

As illustrated in FIGS. 3B through 3D, it can be appreciated that each of the divided images has the same size as the entire size of the image of FIG. 3A to be printed, and has the number of dots arranged therein smaller than that of the image of FIG. 3A to be printed. That is, if all of the plurality of divided images, which are divided to have the number of dots smaller than that of the image to be actually printed, are printed on a single printing medium, an initial image of the divided images is formed on the single printing medium in a first printing operation.

FIGS. 4A through 4F are views illustrating an image dividing method of the array type multi-pass inkjet printer of FIG. 1 according to an embodiment of the present general inventive concept.

FIGS. 4A through 4D illustrate four images, which are obtained by dividing the image to be actually printed illustrated in FIG. 3A in the divided horizontal dividing direction as illustrated in FIG. 3C by the image dividing unit 100.

Referring to FIGS. 4A through 4D, it can be appreciated that a rough outline of each of the four divided images represents a shape of the image to be actually printed as illustrated in FIG. 3A, and each of the four divided images is formed, so that dots representing the shape thereof are arranged of small number and differently from those of other divided images.

Figure 4A:
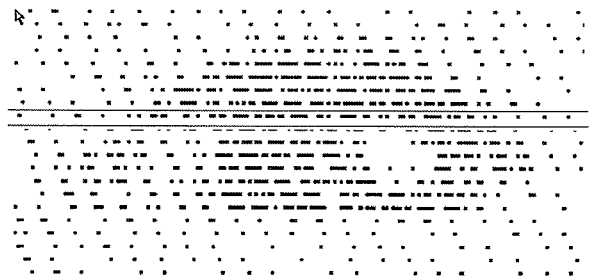
FIGS. 4A through 4F are views illustrating an image dividing method of an array type multi-pass inkjet printer according to an embodiment of the present general inventive concept.

After the printing medium is printed with a first divided image of FIG. 4A by the printing unit 200, the printing medium with the printed divided image is reversely moved without being discharged and is located again at a printable position (printing area A of FIG. 2A). Subsequently, the printing medium is printed with a second divided image of FIG. 4B, and reversely moved again to print a third divided image of FIG. 4C thereon. And then, the printing medium is reversely moved again to print a fourth divided image of FIG. 4D thereon. With the operation described above, a final image as illustrated in FIG. 4E is printed (obtained) on the printing medium.

Figure 4B:
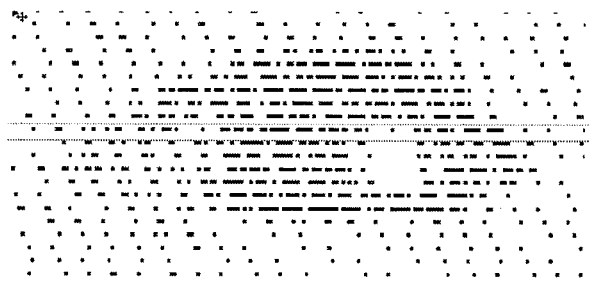
Figure 4C:
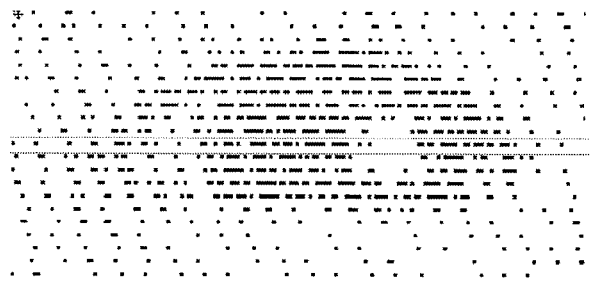
Figure 4D:
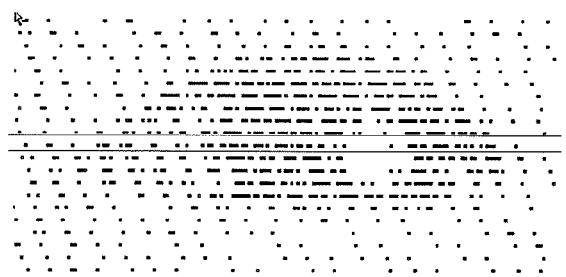
Figure 4E:
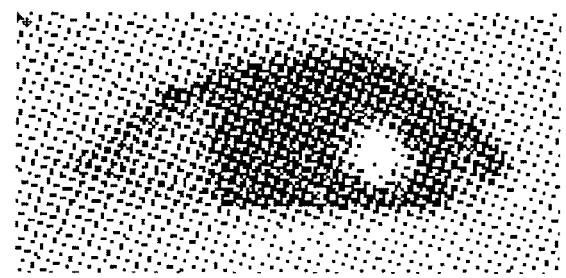

In order to explain a principle of the image dividing method of outputting and obtaining the final image as illustrated in FIG. 4E when the divided images of FIGS. 4A through 4D are printed on the single printing medium as described above, FIG. 4F illustrates magnifying dots of the first through fourth divided images between adjacent lines described in FIGS. 4A through 4D to form the image as a final image.

Figure 4F:
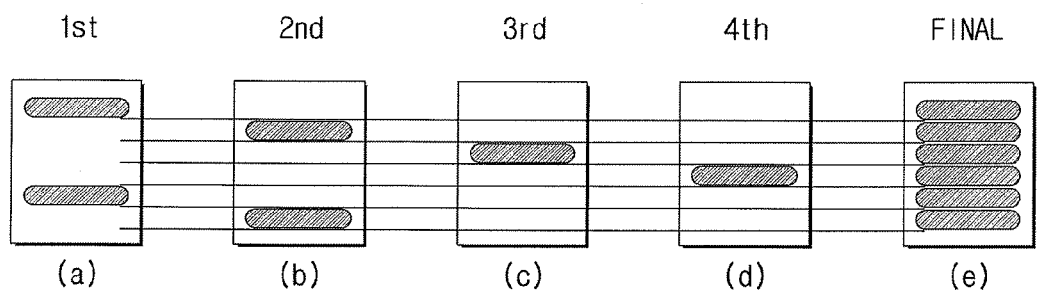

Referring to FIG. 4F, it can be appreciated that if dots 1st in two lines of the first image, dots 2nd in two lines of the second image, dots 3rd in two lines of the third image, and dots 4th in two lines of the fourth image are combined into one, the final image in which the dots are described in all lines can be outputted.

FIGS. 5A through 5D are views illustrating an image dividing method, which is applied to the array type multi-pass inkjet printer of FIG. 1 according to an embodiment of the present general inventive concept.

FIGS. 5A through 5D illustrate states, each of which carries out a printing operation after moving the head 210 by a predetermined distance whenever a corresponding one of the four images divided in the horizontal dividing direction illustrated in FIGS. 4A through 4D is printed.

As illustrated in FIGS. 5A through 5D, the head 210 has a width larger that that of a printing medium A. The width of the printing medium A is perpendicular to a feeding direction of the printing medium A and parallel to a widthwise direction of the printing medium A. That is, the head 210 may have a width of 222.3 mm and may have a printing margin of approximately 4 mm (i.e., 200 pixels) on right and left sides on the basis of a letter size paper. Thus, the head 210 can be controlled to move by a predetermined distance and then to carry out printing operations.

Figure 5A:
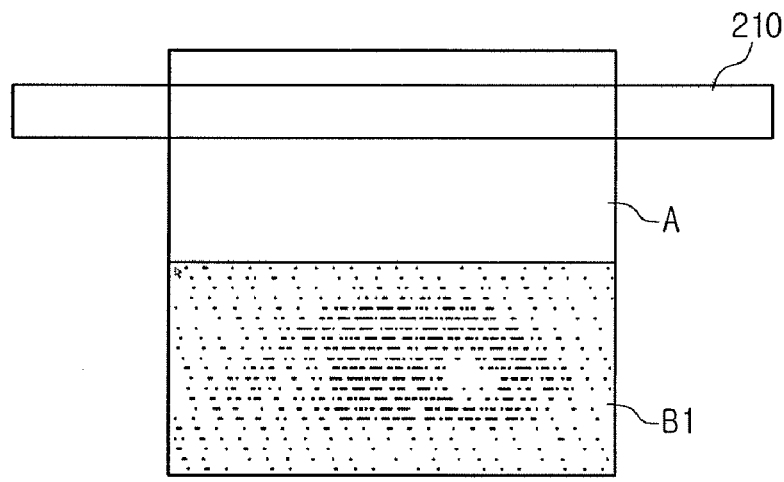
FIGS. 5A through 5D are views illustrating an image dividing method of an array type multi-pass inkjet printer according to an embodiment of the present general inventive concept.

For instance, the head 210 is supposed to move in the widthwise direction by 10 pixels every printing. FIG. 5A illustrates a first state, in which a first image B1 illustrated in FIG. 4A is printed on the printing medium A. After the first image B1 is printed, the head 210 is moved by 10 pixels, and the printing medium A on which the first image B1 is printed is reversely moved.

Figure 5B:
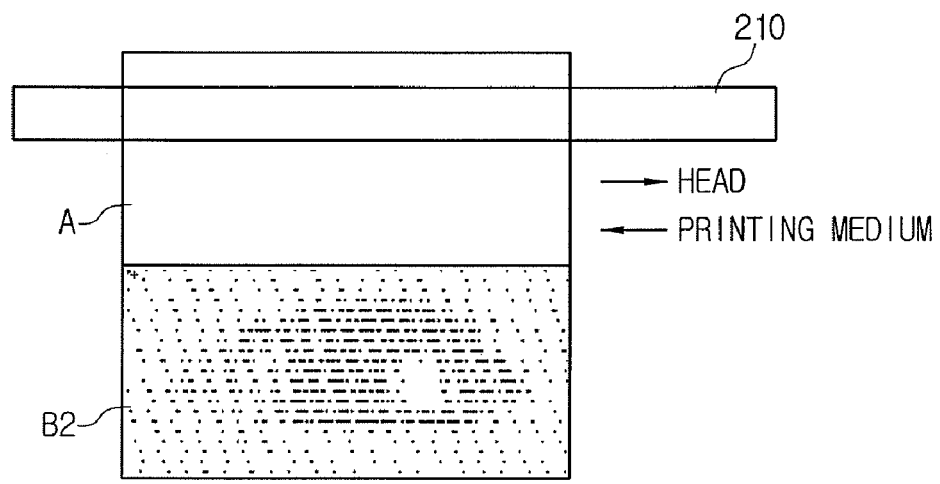

FIG. 5B is illustrates a second state, in which a second image B2 illustrated in FIG. 4B on the printing medium A under the condition that the head 210 is moved right in an arrow direction by 10 pixels from an initial position. After the second image B2 is printed, the head 210 is moved by 10 pixels, and the printing medium on which the first and second images B1 and B2 are printed is reversely moved. At this time, the head 210 is located in a position moved by total 20 pixels from the initial position.

Figure 5C:
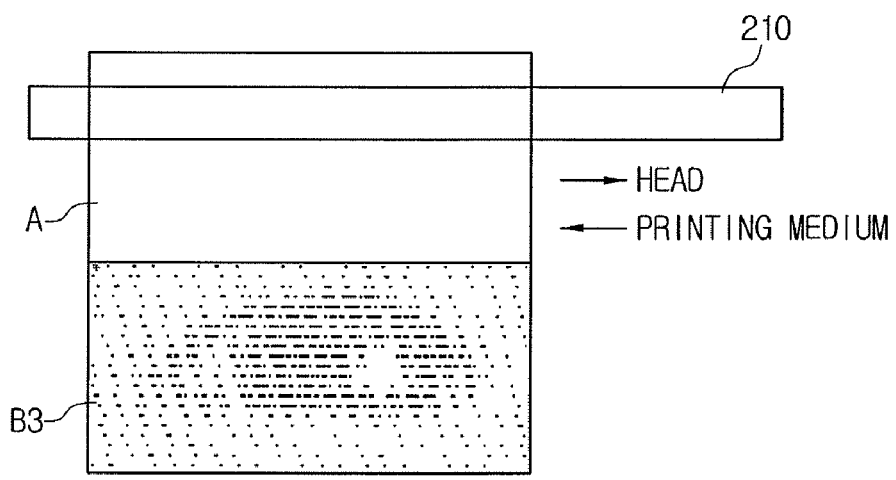

FIG. 5C illustrates a third state, in which a third image B3 illustrated in FIG. 4C is printed on the printing medium A under the condition that the head 210 is moved right by 20 pixels from the initial position. After the third image B3 is printed, the head 210 is moved by 10 pixels, and the printing medium on which the first, the second and the third images B1, B2 and B3 are printed is reversely moved. At this time, the head 210 is located in a position moved by total 30 pixels from the initial position.

Figure 5D:
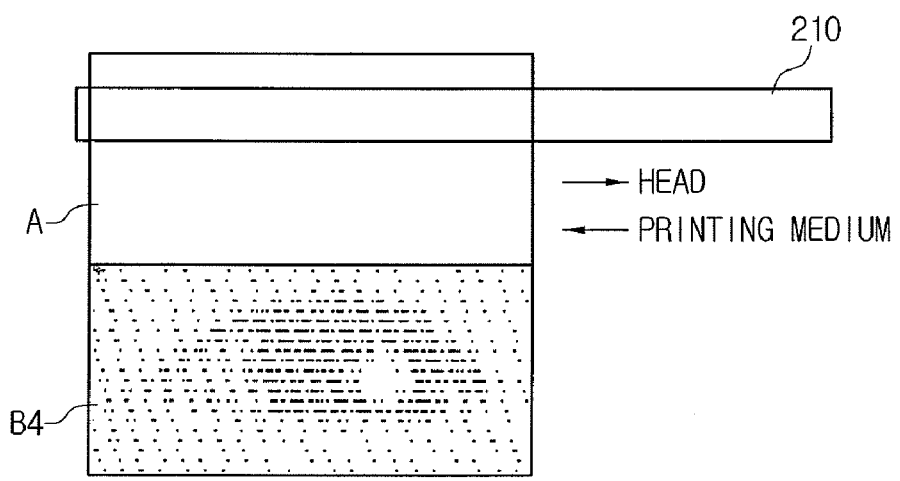

FIG. 5D illustrates a fourth state, in which a fourth image B4 illustrated in FIG. 4D is printed on the printing medium A under the condition that the head 210 is moved right by total 30 pixels from the initial position. After the fourth image B4 is printed, the head 210 is moved by 10 pixels, and the printing medium A on which the first, the second, the third and the fourth images B1, B2, B3 and B4 are printed is reversely moved. At this time, the head 210 is located in a position moved by total 40 pixels from the initial position If there is no remaining divided image, the printing medium A is discharged without being moved reversely.

As illustrated in FIGS. 5A through 5D, when the image to be printed is divided into the four images, the head 210 is moved by 10 pixels every printing. However, the head 210 may have a printing margin of 160 pixels. Accordingly, even though the image to be printed is divided into four or more images, the head 210 can be moved every printing according to an adjusted distance to print a corresponding one of the divided image. That is, the distance, which the head 210 moves, can be adjusted as occasion demands.

FIGS. 6A through 6E are views illustrating an image dividing method, which is applied to the array type multi-pass inkjet printer according to an embodiment of the present general inventive concept.

FIGS. 6A through 6D illustrates four divided images, which are obtained by dividing the image to be actually printed illustrated in FIG. 3A in the random divining direction as illustrated in FIG. 3D by the image dividing unit 100.

Referring to FIGS. 6A through 6D, it can be appreciated that a rough outline of each of the four divided images represents a shape of the image to be actually printed illustrated in FIG. 3A. When each of the four divided images is divided and formed, dots representing the shape thereof are arranged differently from those of other divided images. The dots forming the four divided images illustrated in FIGS. 6A through 6D are randomly arranged without a fixed rule.

Figure 6A:
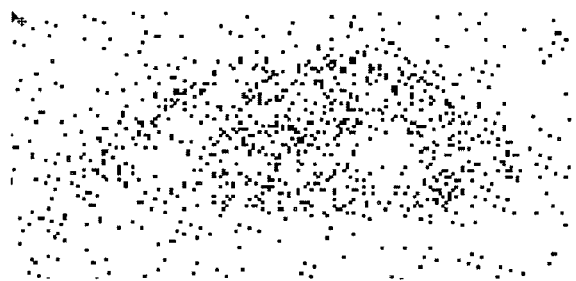
FIGS. 6A through 6E are views illustrating an image dividing method of an array type multi-pass inkjet printer according to an embodiment of the present general inventive concept.
Figure 6B:
Figure 6C:
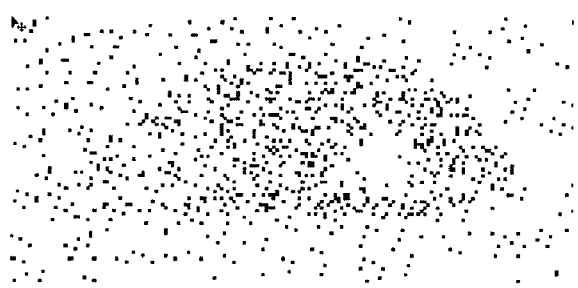
Figure 6D:
Figure 6E:
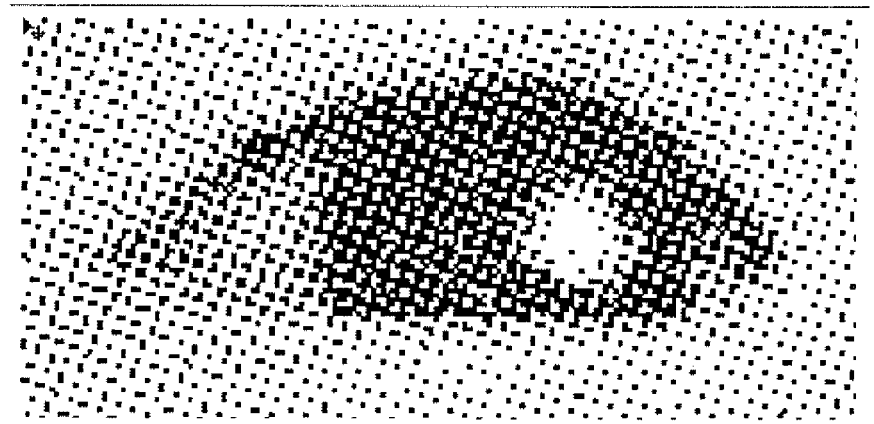

When the four divided images, each of which has the dots randomly arranged differently from those of other divided images as illustrated in FIGS. 6A through 6D, are printed on a single printing medium P, a final image as illustrated in FIG. 6E can be outputted. Also, in this case, if the head 210 is moved every printing to print a corresponding one of the four divided image as illustrated in FIGS. 5A through 5D, the array type multi-pass inkjet printer can compensate for any defective portion of the image (or the divided images), thereby to obtain a larger compensation effect for image and improve a resolution thereof.

Figure 7:
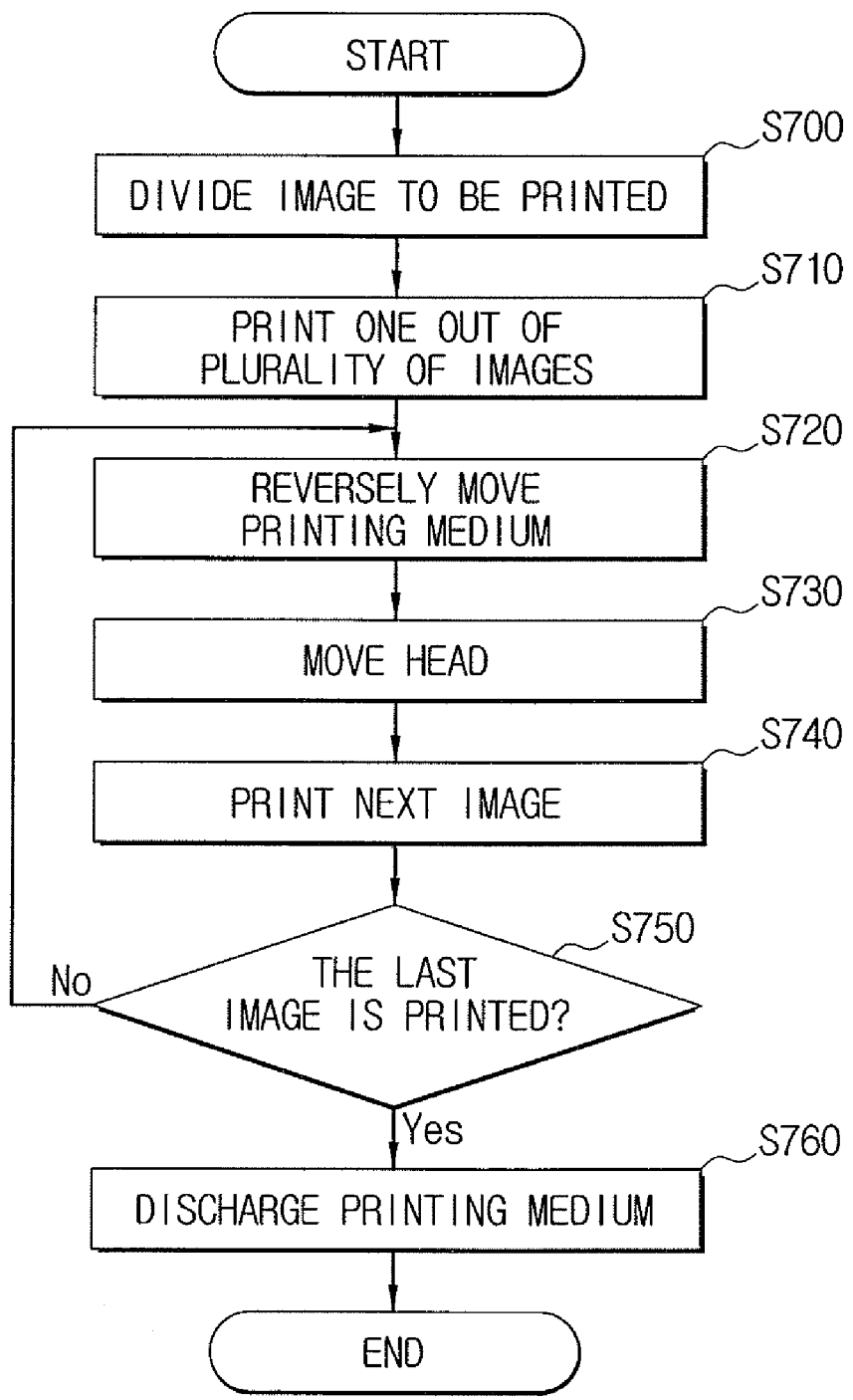
FIG. 7 is a flow chart illustrating an operating method of an array type multi-pass inkjet printer according to an embodiment of the present general inventive concept.

FIG. 7 is a flow chart illustrating an operating method of the array type multi-pass inkjet printer of FIG. 1 according to an embodiment of the present general inventive concept. Here, the operating method of the array type multi-pass inkjet is described with reference to FIGS. 1 through 7.

The image dividing unit 100 divides an image to be printed into a plurality of images, each of which may have the same size as the entire size of the image to be printed, and may have the number of dots smaller than that of the image to be printed, and the dots are arranged to be different from those of other images (S700).

A printing medium A is supplied from the medium-supplying unit C and moved along a direction of arrow illustrated in FIG. 2A. The printing unit 200 prints a first image out of the plurality of divided images on the printing medium A under a control of the control unit 500 (S710).

The printing medium A on which the first image is printed is reversely moved along a direction of arrow illustrated in FIG. 2B to a preceding end of the printing unit 200 or to the inside of the feedback unit 300 by the feedback unit 300 (S720).

The head moving unit 400 moves the head 210 by a predetermined distance, for example, a pixel unit or a nozzle pitch, under a control of the control unit 500 (S730). Since the operation S730 is carried out to more largely increase a compensation effect on the image, so that the operation S730 can be omitted as occasion demands.

After reversely moving the printing medium A and moving the head 210, the control unit 500 controls the printing unit 200 to print a second image next to the printed first image on the printing medium A (S740).

After printing the second image, the control unit 500 determines whether the printed image is the last image out of the plurality of divided images (S750). As a result of the determination in the operation S750, if the printed image is the last image, the printing medium A is discharged to the outside (S760). If the printed image is not the last image, operations after the operation S720 are repeated till the last image is printed.

With the operations described above, the array type multi-pass inkjet printer prints the plurality of divided images having different dot arrangements on the same position of the single printing medium A, so that it prevents the final image from being unevenly outputted due to dead or defective nozzles, thereby compensating the image.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As apparent from the foregoing description, according to the embodiment of the present general inventive concept, the array type multi-pass inkjet printer and the operation method thereof can compensate the image even though the head is not replaced with a new one when there are dead nozzles in the head, and realize a singling function of the shuttle type inkjet printer, thereby realizing a high-resolution image.

Also, according to the embodiment of the present general inventive concept, the array type multi-pass inkjet printer and the operation method thereof can obtain the larger compensation effect for image, if the printing operation is carried out after moving the head by the predetermined distance prior to printing each of the plurality of images divided from the image to be printed on the printing medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An array type multi-pass inkjet printer comprising:
   an image dividing unit to divide an image to be printed into a plurality of images each having the same size as an entire size of the image;
   a printing unit having a head to print one of the plurality of divided images on a printing medium in a printing operation, the head being formed in a lateral direction and having a plurality of nozzles disposed in a longitudinal direction thereof;
   a feedback unit to reversely move the printing medium to a preceding end of the printing unit after the one of the plurality of divided images is printed by the printing unit; and
   a control unit to control the printing unit to print another one of the divided images next to the printed one image on the reversely moved printing medium.

2. The printer of claim 1, wherein each of the plurality of divided images is composed of a portion of entire pixels forming the image to be printed.

3. The printer of claim 1, wherein the image dividing unit comprises a firmware.

4. The printer of claim 1, wherein the printing unit further comprises a position detecting sensor to sense whether the printing medium reversely moved by the feedback unit is positioned at the same position as that thereof in a previous printing operation.

5. The printer of claim 1, wherein the feedback unit comprises:
   a feedback roller to be driven in a direction, to which the printing medium is reversely moved; and
   a diverter to operate in connection with the feedback roller and to determine a path of the printing medium.

6. The printer of claim 1, wherein the control unit controls the feedback unit to reversely move the printing medium until a last image of the plurality of divided images is to be printed.

7. The printer of claim 1, further comprising:
   a head moving unit to move the head in a horizontal direction perpendicular to a feeding direction of the printing medium by a predetermined distance,
   wherein the control unit controls the printing unit to print the divided image next to the printed one image on the reversely moved printing medium after the head is moved by the head moving unit.

8. The printer of claim 7, wherein the predetermined distance is determined by the number of the nozzles to be moved.

* * * * *